United States Patent [19]

Kay

[11] Patent Number: 5,247,320
[45] Date of Patent: Sep. 21, 1993

[54] PROCESS AND APPARATUS FOR PRODUCING COLLAGE PHOTOGRAPHS

[75] Inventor: David L. Kay, Greenville, S.C.

[73] Assignee: CT&T Promotions NV, St. Martin, Netherlands Antilles

[21] Appl. No.: 850,402

[22] Filed: Mar. 11, 1992

[51] Int. Cl.⁵ .............................................. G03B 17/50
[52] U.S. Cl. ..................................... 354/83; 354/120; 354/125; 354/108
[58] Field of Search ................. 354/83, 107, 108, 110, 354/120, 123, 124, 125

[56] References Cited

U.S. PATENT DOCUMENTS

| | | | |
|---|---|---|---|
| 4,268,144 | 5/1981 | Wheeler | 354/108 |
| 4,707,106 | 11/1987 | Johnson et al. | 354/481 |
| 4,717,930 | 1/1988 | Wheeler | 354/108 |
| 4,896,176 | 1/1990 | Barrett | 354/122 |

*Primary Examiner*—David M. Gray
*Attorney, Agent, or Firm*—John B. Hardaway, III; Jeffrey L. Wilson; J. Bennett Mullinax

[57] ABSTRACT

An instant-type camera for producing collage photographs is provided, the camera comprising an overlay transparency designed to fit above a film pack in the camera, the overlay transparency having a predetermined image thereon and a generally gray background of a specified density, whereby photographs produced by the camera include the predetermined image from the overlay transparency such that a unitary and realistic collage photograph is produced.

5 Claims, 3 Drawing Sheets

PROCESS AND APPARATUS FOR PRODUCING COLLAGE PHOTOGRAPHS

BACKGROUND OF THE INVENTION

This invention relates generally to the art of photography and more particularly to a process and apparatus for producing collage photographs.

The production of collage photographs has become increasingly more desireable and popular in order to feature a photograph in which the image of a subject is combined with a previously recorded image. Such collage photographs have proven quite useful, for example, in the sales promotion and fund raising industry, the tourism industry, and various other areas as well. Developments in the production of collage photographs have involved the use of instant-type cameras that can quickly produce photographs.

Various technologies utilize an overlay transparency of some sort to produce a collage photograph. An overlay transparency usually comprises an object to be rendered to the final print and its background. The goal in overlay technology is to create the illusion that all of the elements in the final collage photograph were actually present at the time of exposure.

U.S. Pat. No. 4,268,144, in particular, discloses an instant-type camera attachment for superimposing graphics such as labels on a photograph by using a transparent template bearing opaque letters and positioning the template over a sheet of photographic film within an instant-type camera such that images of the letters are recorded along with objects within the field of view of the camera when a photograph is made.

An extension of this photograph labeling device is disclosed in U.S. Pat. No. 4,717,930 which uses an overlay transparency placed between the taking lens of a camera and the film plane. Light from a flash unit is diffused into a tubular area surrounding the field of view of the camera so that a light modulated background can be added to a photographed scene. The device according to this invention, however, also cannot be used to produce a collage photograph isolating various images on selected portions of the photograph.

U.S. Pat. No. 4,707,106 discloses an auxiliary device for an instant-type camera for use in holding prerecorded images in various positions so that selected areas of a film strip may be exposed in sequence to form a collage.

U.S. Pat. No. 4,896,176 to Barrett also utilizes an overlay transparency placed between the taking lens of a camera and the film plane. Barrett discloses a camera for making collage photographs comprising a lens having a field of view and means for positioning film for exposure substantially along a focal plane of the lens. A screen is positioned to block a portion of the field of view, and a flash is provided for illuminating the screen during film exposure whereby light from the field of view may be directed by the lens by one portion of film positioned along the focal plane and light from the screen directed to a second portion of the film. A film or overlay bearing prerecorded images is mounted over the second portion of the film which enables a collage photograph to be produced with the prerecorded images being separately and distinctly reproduced on the film adjacent the image of objects in the unblocked portion in the field of view. In an alternative embodiment, the camera has a lens and means for positioning film for exposure to light from a field of view of the lens upon a focal plane. A screen is positioned to block a portion of the field of view and a means for illuminating the screen is included so that light from the field of view may be focused by the lens on a first portion of the film and light from the screen focused by the lens on a second portion of the film. An attempt is made to vary the amount of light directed to the overlay transparency image by changing the size of a light port, which is a hole in the light box directly below the camera flash. In this instance, variable illumination from the screen is used to illuminate the previously recorded image recorded onto the overlay transparency. The background behind the previously recorded image is considered a necessary evil and every effort is made to lessen its effect on the final collage photograph. Additional density is thus avoided in the overlay transparency.

The technologies that use an overlay transparency placed between the lens of a camera and the film plane, specifically U.S. Pat. Nos. 4,717,930 and 4,896,176, in an attempt to lessen the impact of the background, specify a background having no density or as little density as possible. Also, the illumination of the overlay is provided by an apparatus that either generates light or redirects and controls light from the primary source of light utilized by the camera for the illumination of its normal field of view. As a result, it has been necessary in the past to provide additional secondary lighting to the image recorded on the overlay transparency to produce a quality collage photograph. Such additional lighting has proven to be quite costly and burdensome. Overlay technologies of the past are also limited in use in that a flash unit is always required preventing the use of the camera in a location having high ambient light such as the out of doors. The necessarily precise position, including distance from the camera and side to side orientation, of the screen or image recorded on the overlay transparency further limits the implementation of prior art overlay technologies.

In light of the prior art devices directed towards producing a collage photograph, significant room for improvement exists in the production of a collage photograph in which a previously recorded image is combined with a subject image in a unitary and realistic manner.

SUMMARY OF THE INVENTION

It is therefore an object of the present invention to provide a novel process and apparatus for producing collage photographs.

It is another object of the present invention to provide such a novel process and apparatus wherein exposure between a photographed scene and a previously recorded image in a collage photograph can be controlled.

It is a further object of the present invention to provide a process and apparatus for producing a collage photograph which does not require use of additional light sources directed onto an image recorded on the overlay transparency used therewith.

It is a still further object of the present invention to provide a process and apparatus for producing a collage photograph which is simple and inexpensive.

These as well as other objects are accomplished by an instant-type camera having a film pack therein, the camera comprising an overlay transparency fitted above the film pack, the overlay transparency having a predetermined image thereon and a generally gray background of a specified density whereby photographs produced by the camera include the predetermined image from the overlay transparency such that a unitary and realistic collage photograph is produced.

DETAILED DESCRIPTION

In accordance with this invention it has been found that a novel process and apparatus for producing collage photographs can be provided. It has been also been found that the process and apparatus for producing collage photographs can be provided wherein exposure between a photographed scene and a previously recorded image in a collage photograph can be controlled so as to produce a collage photograph which combines a previously recorded image with a subject image in a unitary and realistic manner. Additionally, it has been found that the process and apparatus according to this invention can produce a collage photograph without requiring additional light sources directed onto an image recorded on the overlay transparency used therewith. It has further been found that such a novel process and apparatus for producing a collage photograph can be provided which is quite simple and inexpensive.

Figure 1:
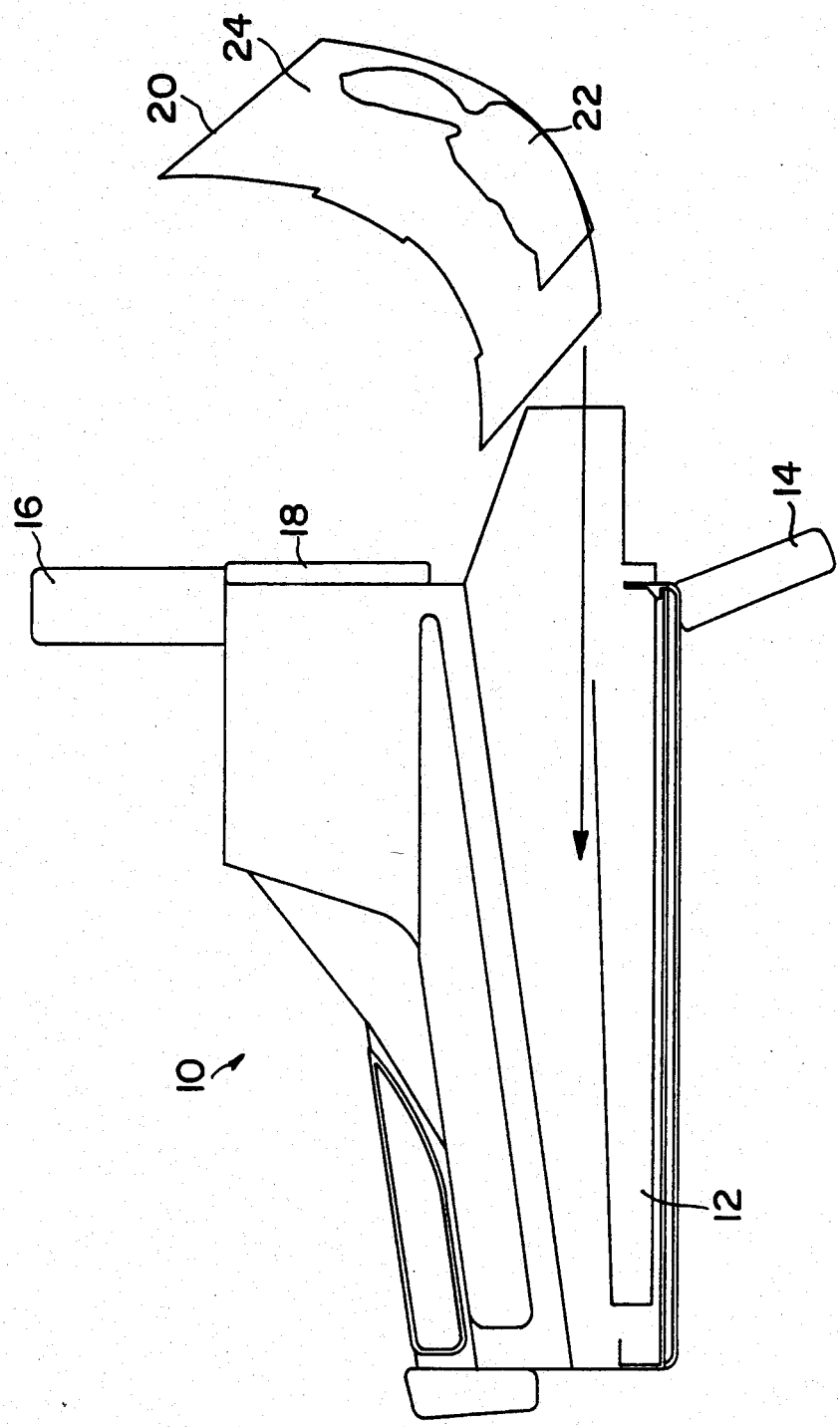
FIG. 1 of the drawings is a side view in cross section of a camera adapted to produce a collage photograph according to the present invention.

FIG. 1 of the drawings is a side view in cross section of a camera 10 adapted to produce a collage photograph according to this invention. As illustrated, the camera 10 according to this invention is an instant-type camera capable of retaining a film pack 12 therein. A closure 14 is seen in FIG. 1 in an open position, but is hingedly attached to camera 10 so that shutting closure 14 completely retains film pack 12 within camera 10. Camera 10 is also illustrated as including a flash 16 and a lens 18. In order to produce a collage photograph, camera 10 further comprises an overlay transparency 20 which is adapted to fit within camera 10. Overlay transparency 20 comprises a predetermined image 22 and background 24 and is designed to be inserted within and attached to camera 10 in a position above film pack 12. Predetermined image 22 is a previously recorded image with which to combine a photographed subject in a collage photograph. Background 24 has a specified density which is important in order to control exposure between predetermined image 22 and a photographed subject within a collage photograph.

In order for overlay transparency 20 to be inserted in camera 10 above film pack 12, it must be manufactured to fit therein. This fitted position will place overlay transparency 20 along but not over light baffle 21, illustrated in FIG. 2, established when film pack 12 is inserted into camera 10.

Figure 2:
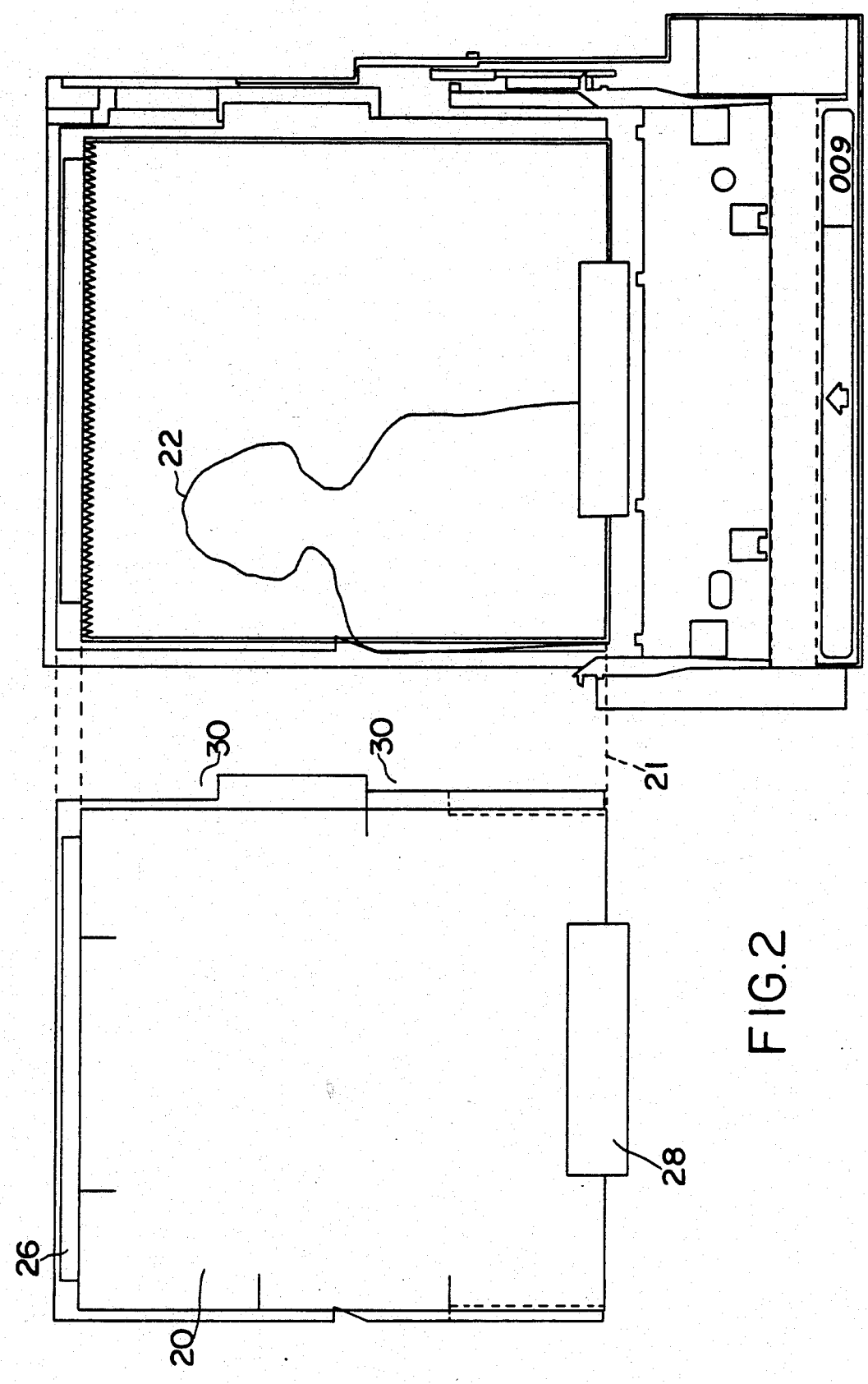
FIG. 2 of the drawings is a plan view of a camera section illustrating placement of an overlay transparency thereon according to the present invention.

FIG. 2 of the drawings is a plan view of a camera section illustrating placement of an overlay transparency 20 thereon according to the present invention. In order for overlay transparency 20 to be inserted within and attached to camera 10, overlay transparency 20 must be fitted to a shape as illustrated in FIG. 2. Once within camera 10 in a position over film pack 12, not visible, overlay transparency 20 may be held in place by a thin strip of double-sided adhesive 26 and tape 28 which is of a minimum thickness. Tape 28 must be thin enough not to obstruct the formation of light baffle 21. Along the sides of overlay transparency 20, notches 30 have been provided to provide clearance for several parts required for normal operation of the camera. It is envisioned that additional peripheral edges of overlay transparency 20 may be shaped as necessary to fit over film packs of various instant-type cameras. Also, as illustrated in figure 2, overlay transparency 20 includes a predetermined image 22 located on a portion of overlay transparency 20 in order to produce a collage photograph which combines a subject image with predetermined image 22.

Figure 3:
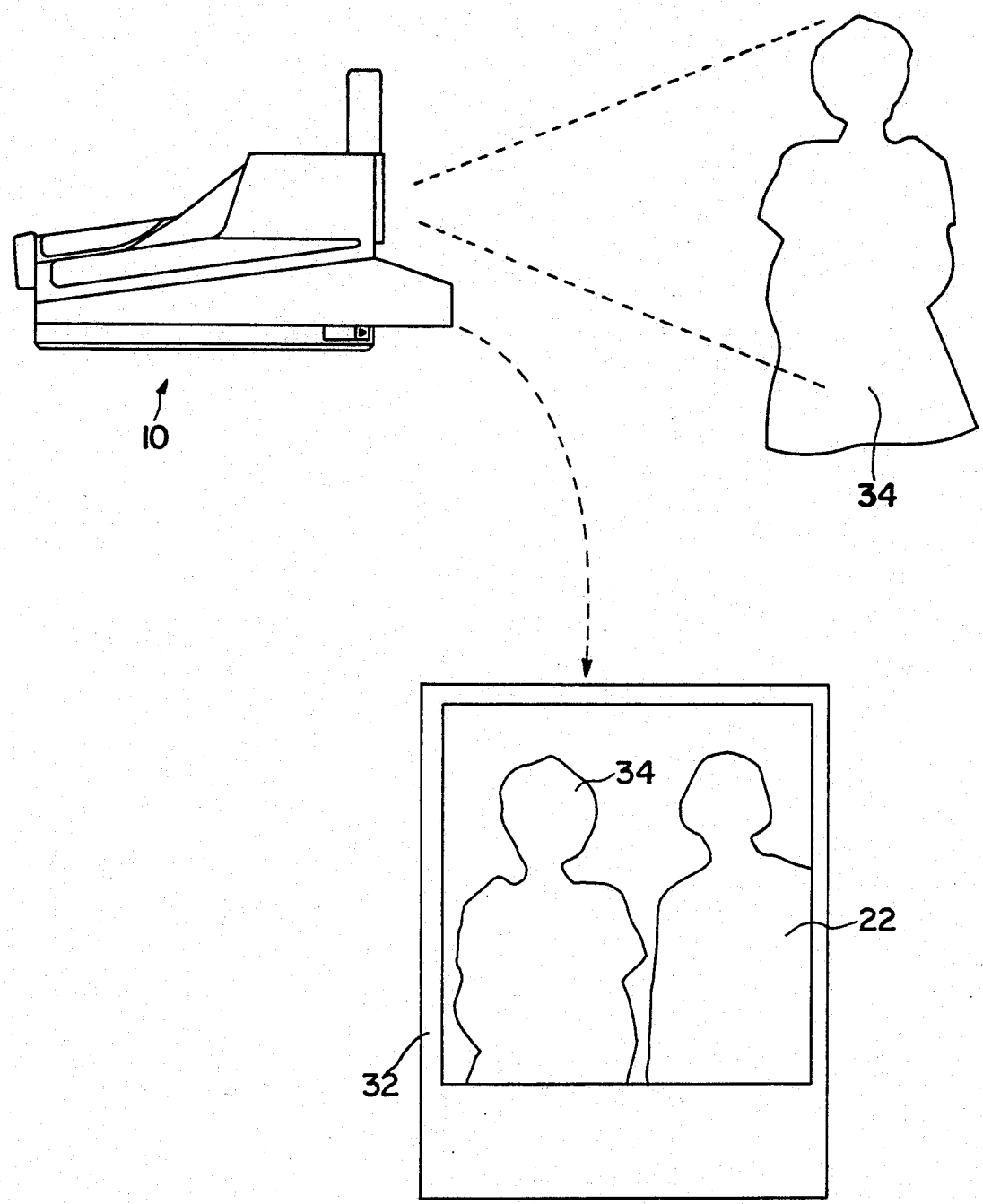
FIG. 3 of the drawings is a diagrammatic view of the camera producing a collage photograph according to the present invention.

FIG. 3 of the drawings is a diagrammatic view of camera 10 producing a collage photograph 32 according to the present invention. As illustrated, camera 10 has a field of view in which a subject 34 to be photographed is located. It is assumed that camera 10 utilizes an overlay transparency 20 as illustrated in FIG. 2 of the drawings. Once a picture of subject 34 is taken with camera 10, a collage photograph 32 is produced which has a combination of predetermined image 22 from overlay transparency 20 (FIG. 2) with the subject 34.

The collage photograph 32 produced in accordance with this invention has a balanced exposure from predetermined image 22 and subject 34. As mentioned with reference to FIG. 1, overlay transparency 20 includes background 24 which is of a specified density. Up to now, it has been thought that any density in the pass through areas of overlay transparency 20 has an ill effect on the final product, a combination of the current scene and image from overlay transparency 20. In an attempt to quantify the concept of minimal density, it has been determined that most films have an optical density in the film base of 0.05 OD and a properly exposed white background may result in an optical density of as great as 0.12 OD, which allows transmission of seventy-six (76) percent of the illumination from the subject image. This level of density would be considered as little as possible.

It has been determined, however, that a gray background on overlay transparency 20 having a greater density can be used to control or lower the amount of exposure from the current scene. Once exposure from the current scene is controllable, a balance between the current scene and the image on overlay transparency 20 can be achieved. A gray background having an optical density as great as 0.27 OD allowing fifty-seven (57) percent light transmission is preferably used on overlay transparency 20 to balance the scene to be photographed with predetermined image 22. When underexposure in the final print is caused by additional density, a means to increase the amount of light used to make the final print can be used. One method comprises increasing output of the camera flash unit. If access to the camera circuitry controlling flash output cannot be obtained, transparent material of a greater density can be placed over a light measuring window of the camera to achieve the same results. This process and apparatus therefore enables a realistic collage photograph to be produced without providing additional directed light sources to predetermined image 22 on overlay transparency 20. This advantageous feature saves on expenses and provides a simple camera for producing a collage photograph which is also quite versatile by its compact nature.

The process according to this invention controls or balances the level of exposure in a collage photograph between an element present prior to the photographed scene, such as predetermined image 22, and the scene to be photographed with a subject such as subject 34 therein. A perfect collage photograph, however, is properly defined as one reproducing tones so that they bear the same proportional relationship throughout as the original. Besides exposure level, this tonal relationship or contrast is the most critical element to achieving the goal of overlay technology. This is especially critical in instant print materials which accept a very narrow range of contrast. The process of film duplication necessary for production of more than one camera also increases contrast in the final print. Suppliers of photographic materials offer films that ar specially produced to help with the contrast problem, however, other film characteristics such as cost and durability may exclude them from use as a suitable overlay film material.

This system achieves control of contrast through the use of an "unsharp contrast mask" allowing the use of a wide range of film materials. In this process, Pan Masking Film 4570 from Eastman Kodak Company is exposed in register with the original color negative and processed in a manner to produce an image mask with a very high density level in the shadow areas of the negative. This mask is then positioned in register with the original negative for printing. By comparing density readings in the highlight and shadow areas of the negative prior to and after the addition of the mask, it was determined that a contrast range reduction of sixty-six (66) percent was obtained. The overlay produced with the greatly reduced contrast range of 0.52 results in a final product that meets or exceeds the goal of overlay technology. The greatly reduced contrast range is generally twice as flat (low contrast) as any other known process.

Another aspect of the overlay illusion is the lighting of a subject used to produce predetermined image 22 on overlay transparency 20. There are two aspects of this lighting to consider, the lighting of the subject and the lighting of the background. In order for the overlay illusion to work in a collage photograph, both the subject used for predetermined image 22 and subject 34 imaged at the time of the final print require compatible lighting. The lighting on the camera taking the final print is commonly refer to as "on camera flash." This type of lighting normally used in candid photography has the characteristics of being harsh and shadowless light. This type of lighting may be considered exceedingly unflattering for the lighting to be used for producing predetermined image 22, however, a simple two light configuration provides better modeling and still remains compatible with "on camera flash."

In a preferred process of photographing a subject to be used as predetermined image 22 on overlay transparency 20, the subject should be positioned in front of a background at a distance of approximately three (3) feet from the background. A pair of lights are positioned a distance from the background toward the sides of the subject such that the lights and the subject form a triangle. A camera is positioned between the subject and the lights, preferably six (6) feet from the subject. In order for the background in overlay transparency 20 to have the necessary level of gray, a simple white background is used, however, a gray background behind the subject can also produce an overlay transparency 20 with the necessary density of gray background. A distance of four (4) feet between the subject and the background reduces the white background by one-half.

Utilization of this process and apparatus for producing a collage photograph therefore is much more simple and versatile than devices used in the past. Moreover, the overlay transparency is inexpensive to produce and can be easily produced in mass quantity. As a convenience feature, the overlay transparency according to this invention can be quickly adapted to fit into most any off-the-counter instant-type camera. As an additional feature of this invention, the overlay transparency can be glue-bonded in position within the camera if desired so as to tear if removed and to prevent wrongful removal or improper use of the overlay transparency, thereby providing protection to the owner of the high quality celebrity image.

It is thus seen that the present invention provides a novel process and apparatus for producing collage photographs. It is also seen that such a novel process and apparatus is provided wherein exposure between a photographed scene and a previously recorded image in a collage photograph can be controlled. It is further seen that the present invention provides a process and apparatus for producing a collage photograph which does not require use of additional light sources directed onto an image recorded on an overlay transparency used therewith. It is still further seen that the present invention provides a process and apparatus for producing a collage photograph which is simple and inexpensive. Many variations are apparent to those of skill in the art, and such variations are embodied within the spirit and scope of the present invention as measured by the following appended claims.

That which is claimed:

1. An instant-type camera for producing collage photographs, said camera capable of retaining a film pack therein, said camera comprising:
   an overlay transparency fitted above the film pack, said overlay transparency having a predetermined image thereon and a generally gray background of a specified density approximately .015 or higher
   whereby photographs produced by the camera in normal operation include the predetermined image from the overlay transparency such that a unitary and realistic collage photograph is produced.

2. A camera according to claim wherein the overlay transparency is attached to the camera so that a film pack can be inserted, used and removed from said camera without being hindered by said overlay transparency.

3. A process of producing a collage photograph comprising the steps of:
   positioning an overlay transparency having a predetermined image thereon and a generally gray background of a specified density approximately 0.15 or higher above a film pack in an instant-type camera; and
   photographing a subject with said camera;
   whereby the camera produces a unitary and realistic collage photograph of the predetermined image and the subject.

4. The process according to claim 3 further including the step of attaching said overlay transparency to said camera after positioning said overlay transparency above said film pack.

5. The process according to claim 4 wherein said overlay transparency is attached to said camera so as to allow normal operation of said camera to occur.

* * * * *